(12) United States Patent
Wei (10) Patent No.: US 8,797,725 B2
(45) Date of Patent: Aug. 5, 2014

(54) POWER ADAPTER DEVICE PROVIDED WITH A MOUSE PAD

(75) Inventor: Ren-Jing Wei, New Taipei (TW)

(73) Assignee: Wistron Corporation, New Taipei (TW)

( * ) Notice: Subject to any disclaimer, the term of this patent is extended or adjusted under 35 U.S.C. 154(b) by 287 days.

(21) Appl. No.: 13/495,135

(22) Filed: Jun. 13, 2012

(65) Prior Publication Data

US 2013/0017736 A1    Jan. 17, 2013

(30) Foreign Application Priority Data

Jul. 15, 2011    (TW) .............................. 100125127 A (51) Int. Cl.
| G06F 1/16 | (2006.01) |
| G06F 1/26 | (2006.01) |
| G06F 3/039 | (2013.01) |

(52) U.S. Cl.
CPC ................ G06F 1/26 (2013.01); G06F 3/0395 (2013.01)
USPC ............ 361/679.02; 361/679.08; 361/679.09; 361/679.1; 312/223.1; 312/223.2

(58) Field of Classification Search
CPC .................................. G06F 3/0395; G06F 1/26
USPC ............... 361/679.02, 679.08, 679.09, 679.1; 312/223.1, 223.2; 429/96–100, 123
See application file for complete search history.

(56) References Cited

U.S. PATENT DOCUMENTS

| 5,628,483 | A | * | 5/1997 | Smith et al. ................... 248/118 |
| 6,040,977 | A | * | 3/2000 | Hoffer ...................... 361/679.55 |
| 6,269,948 | B1 | * | 8/2001 | Jackson ........................ 206/320 |
| 6,971,619 | B2 | * | 12/2005 | Pearson ................... 248/346.01 |
| 7,365,967 | B2 | * | 4/2008 | Zheng ...................... 361/679.09 |
| 2003/0048595 | A1 | * | 3/2003 | Hsieh et al. ................... 361/680 |
| 2005/0067319 | A1 | * | 3/2005 | Wei .............................. 206/576 |
| 2005/0212770 | A1 | * | 9/2005 | Lin et al. ....................... 345/163 |
| 2006/0102334 | A1 | * | 5/2006 | Tuma ............................ 165/276 |
| 2009/0265897 | A1 | * | 10/2009 | Haynes .......................... 24/303 |
| 2010/0230557 | A1 | * | 9/2010 | Healey ....................... 248/118.1 |
| 2011/0267266 | A1 | * | 11/2011 | Xiang ........................... 345/157 |
| 2011/0309212 | A1 | * | 12/2011 | Guerrieri et al. .............. 248/118 |
| 2012/0062462 | A1 | * | 3/2012 | Lin et al. ....................... 345/163 |
| 2012/0194448 | A1 | * | 8/2012 | Rothkopf ....................... 345/173 |
| 2013/0186699 | A1 | * | 7/2013 | Prahlad et al. .................. 180/55 |

* cited by examiner

Primary Examiner — David M Sinclair
Assistant Examiner — Robert Brown
(74) Attorney, Agent, or Firm — Dickstein Shapiro LLP (57) ABSTRACT

A power adapter device is to be applied to an electronic device, and includes a power adapter and a carrying pad. The power adapter includes a power adapter body, which has a pad-connecting end and a pad-storing end opposite to said pad-connecting end. The carrying pad has a free end, and an adapter-connecting end opposite to the free end and connected to the pad-connecting end. The carrying pad is switchable with respect to the power adapter body between an unfolded state, where the carrying pad is unfolded at one side of the power adapter body with the free end remote from the power adapter body, and a stored state, where the carrying pad is folded toward the power adapter body with the free end being close to the pad-storing end.

18 Claims, 11 Drawing Sheets

POWER ADAPTER DEVICE PROVIDED WITH A MOUSE PAD

CROSS-REFERENCE TO RELATED APPLICATION

This application claims priority of Taiwanese Patent Application No. 100125127, filed on Jul. 15, 2011, the disclosure of which is incorporated herein by reference.

BACKGROUND OF THE INVENTION

1. Field of the Invention

The invention relates to a power adapter device, and more particularly to a power adapter device provided with a mouse pad.

2. Description of the Related Art

A notebook computer is typically provided with a touch pad, which allows a user to control a cursor on the screen. However, for many users used to using a mouse, an external mouse would be required, in which, it is necessary to find an operation region for operating the mouse after the notebook computer is positioned. It is not difficult to find an operation region when the notebook computer is placed on a desk, but it would be inconvenient if the notebook is placed on the lap.

Currently, some manufacturers have devoted their efforts to research and develop a solution to the above problem, for example, by providing a mouse pad for placing a mouse at a base of the notebook computer. However, the current design still needs to be improved. For example, the base of the notebook computer is bulky, making it difficult to carry the notebook computer, which is originally intended to be portable. Therefore, how to design a mouse pad that is useful for a notebook computer without substantially creating an additional burden when carrying the notebook computer is the goal to be achieved by the present invention.

SUMMARY OF THE INVENTION

Therefore, an object of the present invention is to provide a power adapter device adapted for integrating a mouse pad to a power adapter.

Accordingly, a power adapter device of this invention is configured to be applied to an electronic device having a device body and a power-line socket disposed on the device body. The power adapter device comprises a power adapter and a carrying pad.

The power adapter includes a power adapter body having a pad-connecting end, and a pad-storing end opposite to the pad-connecting end.

The carrying pad has a free end and an adapter-connecting end opposite to the free end. The adapter-connecting end is connected to the pad-connecting end of the power adapter body. The carrying pad is switchable with respect to the power adapter body between an unfolded state, where the carrying pad is unfolded at one side of the power adapter body with the free end being far from the power adapter body, and a stored state, where the carrying pad is folded toward the power adapter body with the free end being close to the pad-storing end of the power adapter body.

The carrying pad further includes a plurality of pad components that are pivotally connected to one another, that are co-planar in the unfolded state, and that are folded with respect to one another in the stored state.

The carrying pad further includes a first pad component, a second pad component, and at least one third pad component. The first pad component has a first pad body and a pivotal part formed on the first pad body and pivotally connecting the first pad body to the pad-connecting end of the power adapter body. The pivotal part and the first pad body together define the free end of the carrying pad. The second pad component has a second pad body, and an engaging part formed on the second pad body and connecting the second pad body removably to the pad-storing end of the power adapter body. The engaging part and the second pad body together define the adapter-connecting end. The third pad component has a third pad body that is disposed between the first pad body and the second pad body and that has two opposite ends pivot respectively on the first pad body and the second pad body.

Further, the first pad body has a first abutting face, the second pad body has a second abutting face, and the third pad body has two opposite third abutting faces, one of which is adjacent to the first abutting face of the first pad body and the other of which is adjacent to the second abutting face of the second pad body. When the carrying pad is located in the unfolded state, any two adjacent ones of the first, second and third abutting faces are in tight contact with each other, such that the carrying pad forms a horizontal plane.

The first pad component further has a positioning part adjacent to the pad-connecting end of the power adapter body, and the positioning part of the first pad component abuts against a bottom face of the power adapter body when the carrying pad is located in the unfolded state.

The power adapter further includes a connector extending outwardly from the power adapter body and connected to the electronic device, and the power adapter body is attachable removably to the device body of the electronic device.

The electronic device further includes a first connecting mechanism disposed on one side of the device body, and the power adapter further includes a second connecting mechanism disposed on the power adapter body and configured to engage the first connecting mechanism of the electronic device.

The second connecting mechanism is configured as a hook member that has a distal end, that protrudes laterally from the power adapter body, and that is bent upwards with the distal end facing upwards.

The first connecting mechanism includes two blocking walls facing each other and a hole disposed between the blocking walls. The second connecting mechanism includes an engaging component having a pair of distal barbs elastically movable toward each other. When the second connecting mechanism is engaged with the first connecting mechanism, the distal barbs extend into the hole and respectively engage the blocking walls. The distal barbs are movable toward each other so as to be released from the blocking walls and to be removed from the hole.

The engaging component further includes a pair of elastic arms each of which has a first end and a second end. The first end of one of the elastic arms is connected to the first end of the other one of the elastic arms to cooperatively define a clipping end, and each of the distal barbs is disposed at the second end of a respective one of the elastic arms. The second connecting mechanism further includes a switch that is slidably disposed on the power adapter body to move toward and away from the distal barbs and that has a groove allowing the clipping end of the engaging component to extend thereinto. When the switch slides toward and is close to the distal barbs, the elastic arms are pressed by the switch to drive the distal barbs to move toward each other.

Another object of the present invention is to provide an assembly comprising an electronic device and the above-mentioned power adapter device. The electronic device includes a device body, a first connecting mechanism disposed on one side of the device body, and a power-line socket close to the first connecting mechanism.

The effect of the present invention is that, by integrating a carrying pad with a power adapter, a power adapter originally only having a power supply function further provides a mouse pad function.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

The above-mentioned and other technical contents, features, and effects of this invention will be clearly presented from the following detailed description of the embodiments in coordination with the reference drawings.

Before this invention is described in greater detail, it should be noted that, in the following description, similar elements are denoted by the same reference numerals.

Figure 1:
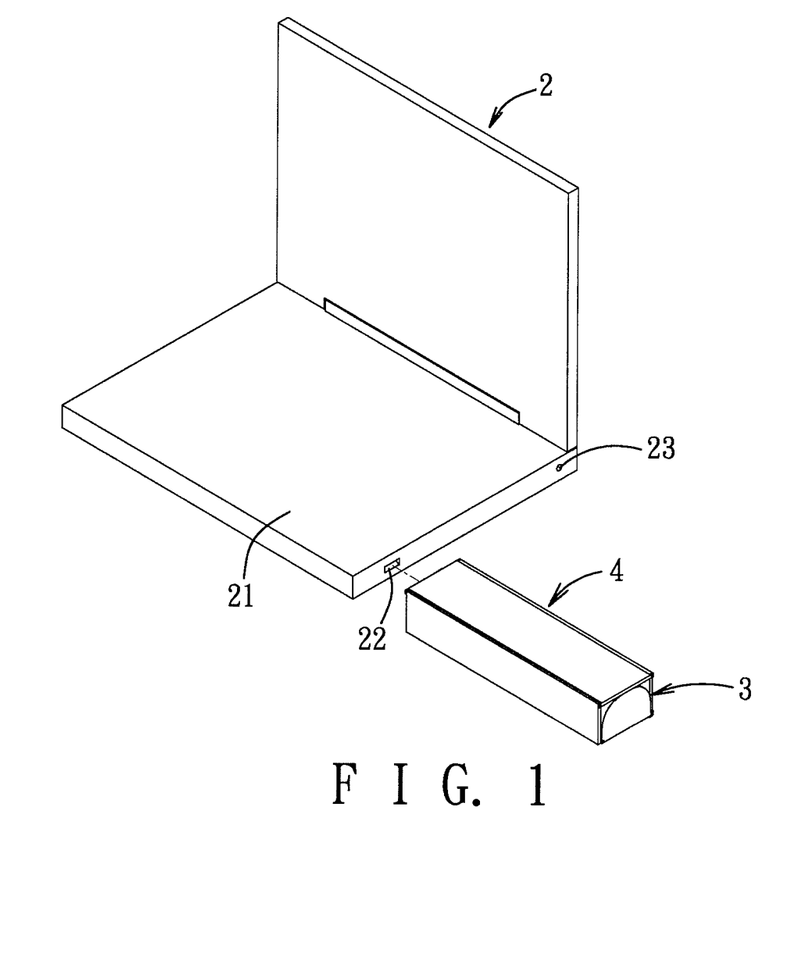
FIG. 1 is a perspective view illustrating an embodiment of an assembly of an electronic device and a power adapter device according to the present invention.
Figure 2:
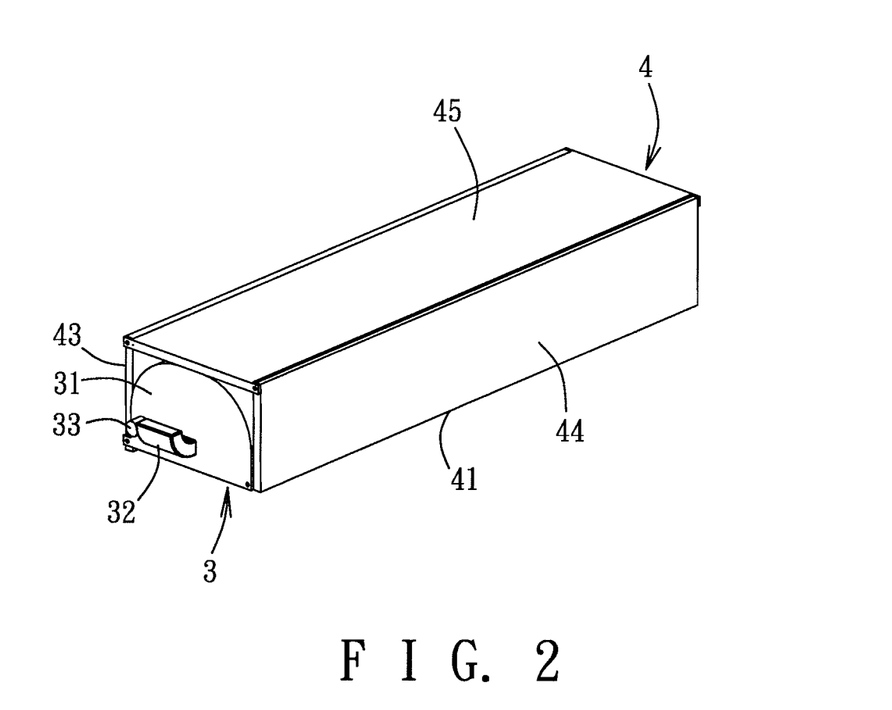
FIG. 2 is a perspective view illustrating an embodiment of the power adapter device provided with a carrying pad according to the present invention, where the carrying pad is in a stored state.
Figure 3:
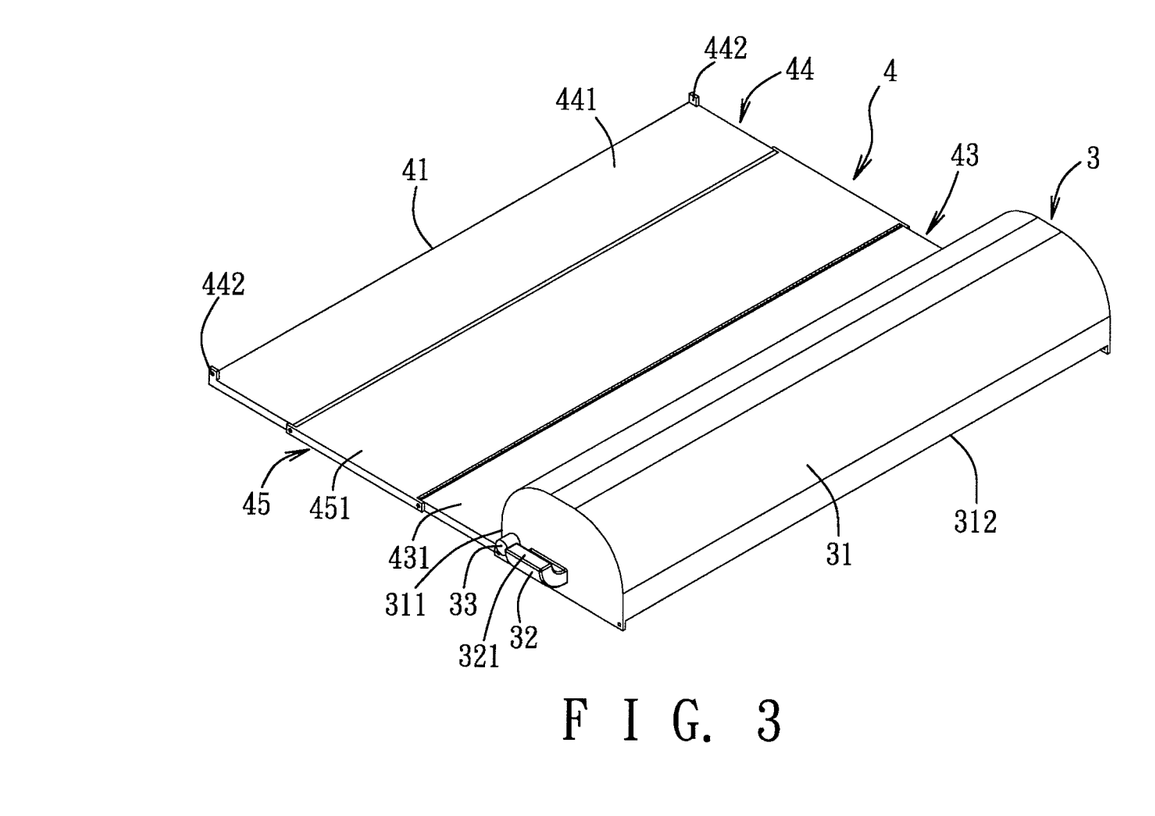
FIG. 3 is a perspective view of the power adapter device, where the carrying pad is in an unfolded state and serves as a mouse pad.

Referring to FIGS. 1 to 3, an embodiment of an assembly of an electronic device 2 and a power adapter device according to the present invention is shown. The power adapter device includes a power adapter 3 and a foldable carrying pad 4.

The electronic device 2 in this embodiment is a notebook computer, and includes a device body 21, a first connecting mechanism 22 disposed on one side of the device body 21, and a power-line socket 23 adjacent to the first connecting mechanism 22.

The power adapter 3 is configured to be electrically connected to the electronic device 2 for supplying electric power to the electronic device 2. The power adapter 3 includes a power adapter body 31, a second connecting mechanism 32 disposed on the power adapter body 31 and configured to be engaged with the first connecting mechanism 22 of the electronic device 2, and a connector 33 protruding from the power adapter body 31 and configured to be electrically connected to the power-line socket 23 of the electronic device 2. The power adapter body 31 has a pad-connecting end 311 and a pad-storing end 312 opposite to the pad-connecting end 311. In this embodiment, the second connecting mechanism 32 is configured as a hook member, and has a distal end 321. As a whole, the second connecting mechanism 32 protrudes laterally from the power adapter body 31, and is bent upwards with the distal end 321 facing upwards. In another aspect of this embodiment, the first connecting mechanism 22 of the electronic device 2 is a hole, and the second connecting mechanism 32 can be engaged with the hole and fixed therein.

Figure 4:
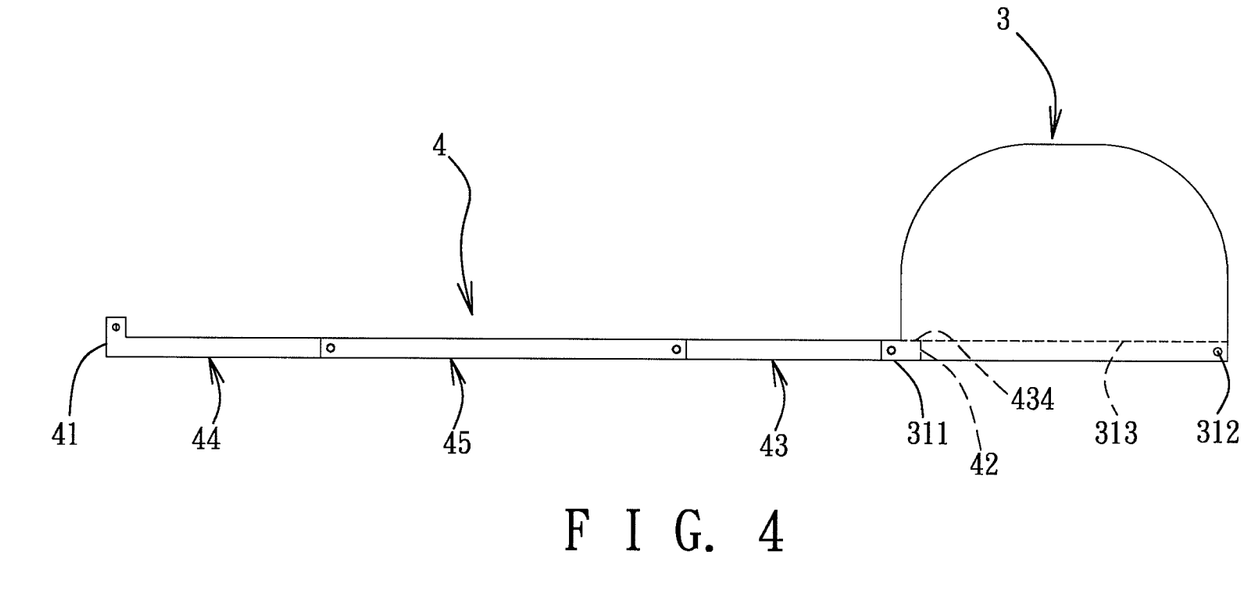
FIG. 4 shows the power adapter device of FIG. 3 in another viewing angle, where the carrying pad is in a planar configuration.

Referring to FIGS. 2 to 4, the carrying pad 4 has a free end 41 and an adapter-connecting end 42 opposite to the free end 41. The adapter-connecting end 42 is connected to the pad-connecting end 311 of the power adapter 3, such that the carrying pad 4 is switchable between an unfolded state (as shown in FIG. 3) and a stored state (as shown in FIG. 2) with respect to the power adapter body 31 of the power adapter 3. In the unfolded state, the carrying pad 4 is spread at one side of the power adapter body 31 with the free end 41 far from the power adapter body 31. In the stored state, the carrying pad 4 is folded toward the power adapter body 31 with the free end 41 close to the power adapter body 31.

More specifically, in the unfolded state, the carrying pad 4 serves as a mouse pad to provide a plane for placing a mouse thereon. In the stored state, the carrying pad 4 is stored and has a shape matching a shape of the power adapter 3 by bending, folding, and winding, thereby reducing the space and area occupied by the carrying pad 4.

In this embodiment, the adapter-connecting end 42 is pivotally connected to the pad-connecting end 311 through a shaft-to-hole engagement. Either the free end 41 or the pad-storing end 312 is configured as a protruding shaft, and the other one is configured as an engagement notch corresponding to the protruding shaft, such that the free end 41 of the carrying pad 4 is attached removably to the pad-storing end 312 of the power adapter body 31.

Figure 5:
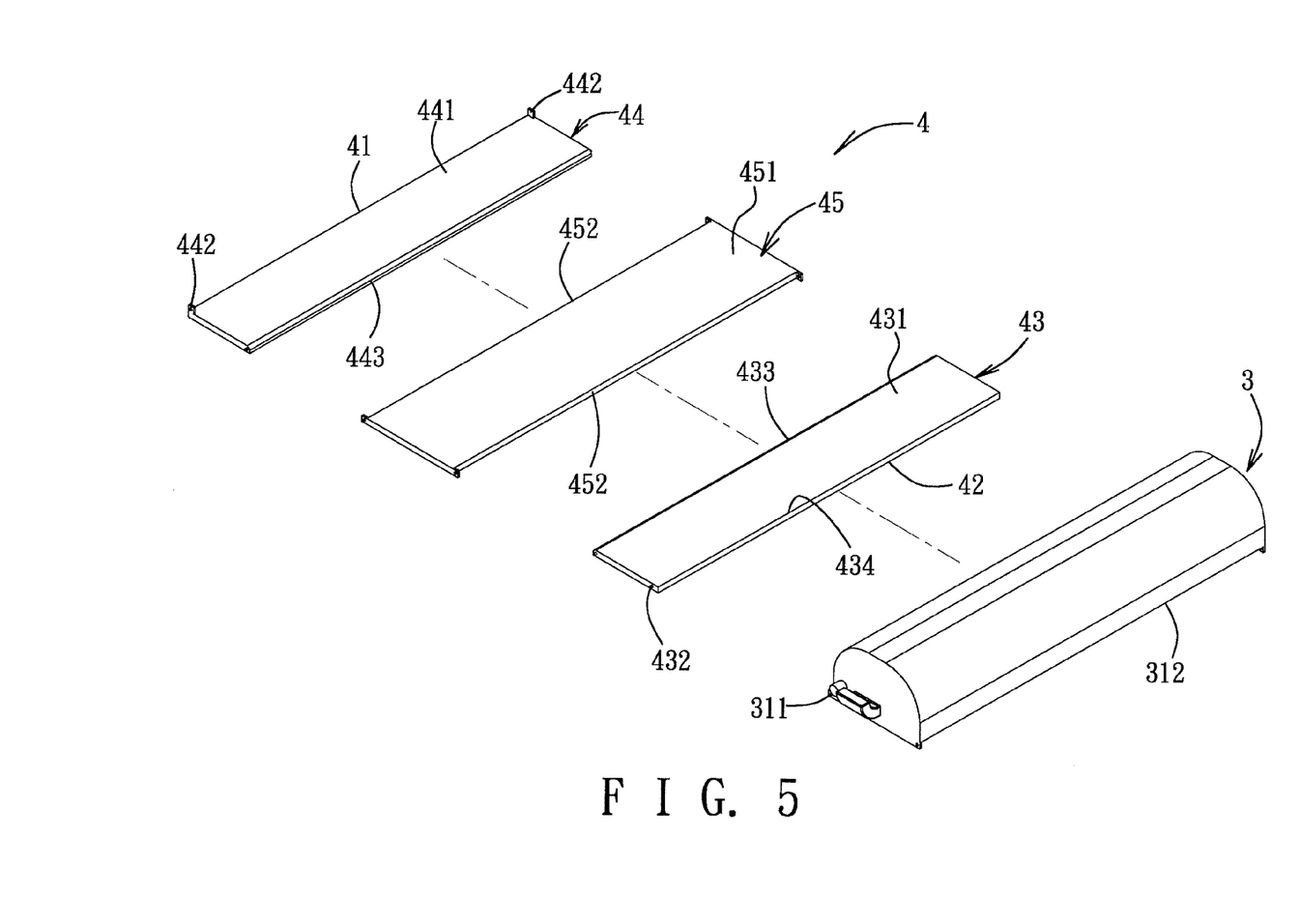
FIG. 5 is an exploded perspective view illustrating components of the power adapter device according to the present invention.

Furthermore, as shown in FIG. 5, in this embodiment, the carrying pad 4 includes a plurality of pad components pivotally connected to one another. The pad components include a first pad component 43, a second pad component 44, and a third pad component 45 disposed between the first and second pad components 43, 44. The first pad component 43 has a first pad body 431, two pivotal parts 432 respectively formed on two opposite lateral sides of the first pad body 431 and for pivotally connecting the first pad body 431 to the pad-connecting end 311 of the power adapter body 31, and a positioning part 434 close to the pad-connecting end 311 of the power adapter body 31. Each of the pivotal parts 432 may be configured as, for example, a shaft or a hole disposed on a respective one of two opposite side edges of the first pad body 431 and engaged with a corresponding hole or shaft disposed on the pad-connecting end 311 of the power adapter body 31.

It should be noted that, although a number of the pivotal parts 432 is equal to two in this embodiment, this is only an exemplary implementation. The number of the pivotal parts 432 is not limited thereto and can be increased or decreased depending upon design requirements from manufacturers and/or users.

The second pad component 44 has a second pad body 441 spaced apart from the first pad body 431, and two engaging parts 442 respectively formed on two opposite lateral sides of the second pad body 441 and used for connecting removably the second pad component 44 to the pad-storing end 312 of the power adapter body 31. Each of the engaging parts 442 may be configured as, for example, a shaft or a hole disposed on a respective one of two opposite side edges of the second pad body 441 and to be engaged with the hole- or shaft-implementing pad-storing end 312 of the power adapter body 31.

The third pad component 45 has a third pad body 451 disposed between the first pad body 431 and the second pad body 441. Two opposite ends of the third pad body 451 are pivotally and respectively connected to the first pad body 431 and the second pad body 441.

Referring to FIGS. 4 and 5, it should be noted that, in order for the first, second and third pad components 43, 44, 45 to form a plane for carrying a mouse (shown in FIG. 4) when the carrying pad 4 is in the unfolded state, the first pad body 431 further has a first abutting face 433, the second pad body 441 further has a second abutting face 443, the third pad body 451 further has two opposite third abutting faces 452. One of the third abutting faces 452 is adjacent to and abuts against the first abutting face 433 of the first pad body 431, and the other of the third abutting faces 452 is adjacent to and abuts against the second abutting face 443 of the second pad body 441. In this embodiment, each of the abutting faces 433, 443 and 452 is flat. As such, when the carrying pad 4 is disposed in the unfolded state, any two adjacent ones of the first, second and third abutting faces 433, 443, and 452 are in tight contact with each other by face-to-face alignment, such that top surfaces of the pad components 43, 44, 45 are connected together to form the plane for carrying a mouse.

The positioning part 434 of the carrying pad 4 is configured to provide support for the carrying pad 4. The adapter-connecting end 42 of the carrying pad 4 is connected to the pad-connecting end 311 of the power adapter body 31 through a shaft-to-hole engagement to be pivotally connected to each other. When the carrying pad 4 is disposed in the unfolded state, the positioning part 434 abuts against a bottom face 313 of the power adapter body 31, so that the carrying pad 4 remains horizontal even when it is suspended, thereby avoiding the free end 41 from moving downwards due to gravity.

In addition, although there are two engaging parts 442 in this embodiment, one or more engaging parts 442 may be provided in practice, as long as the number of the engaging parts 442 is sufficient for attaching the free end 41 of the carrying pad 4 to the power adapter body 31.

Figure 6:
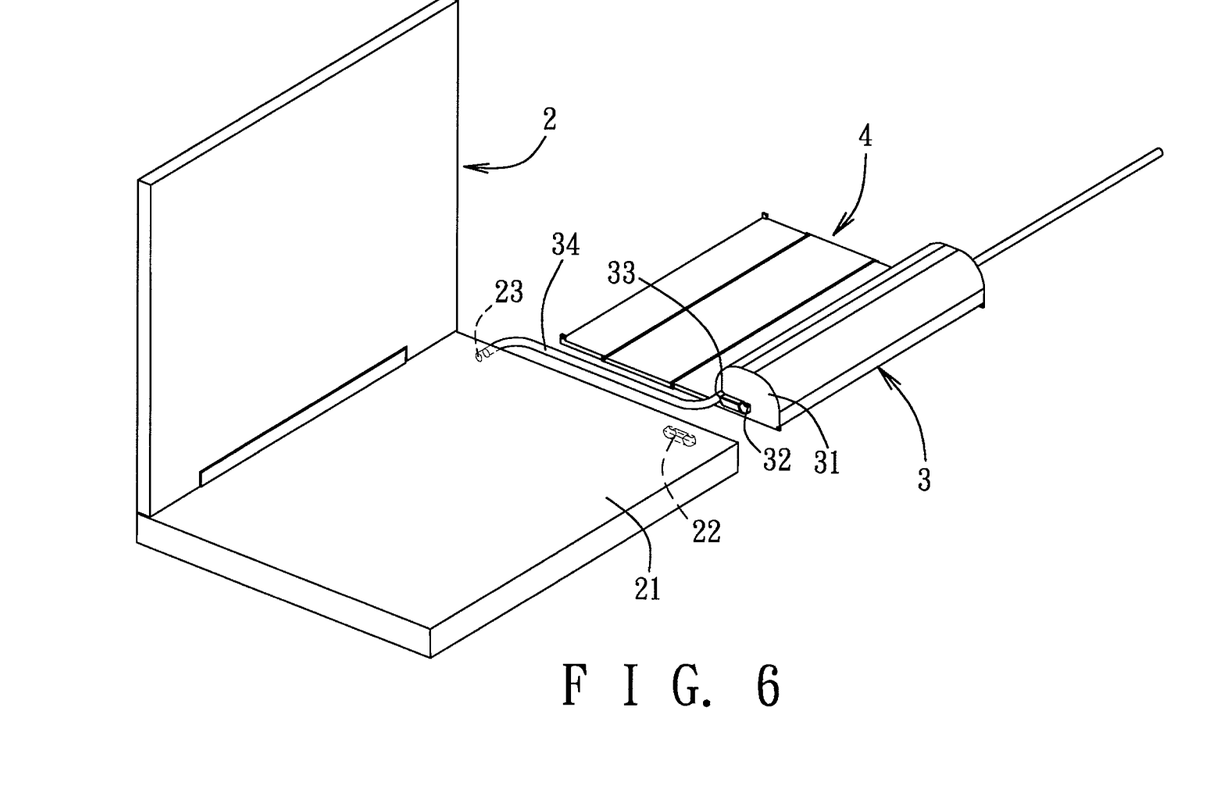
FIG. 6 is a schematic view illustrating the power adapter device connected to the electronic device according to the present invention.
Figure 7:
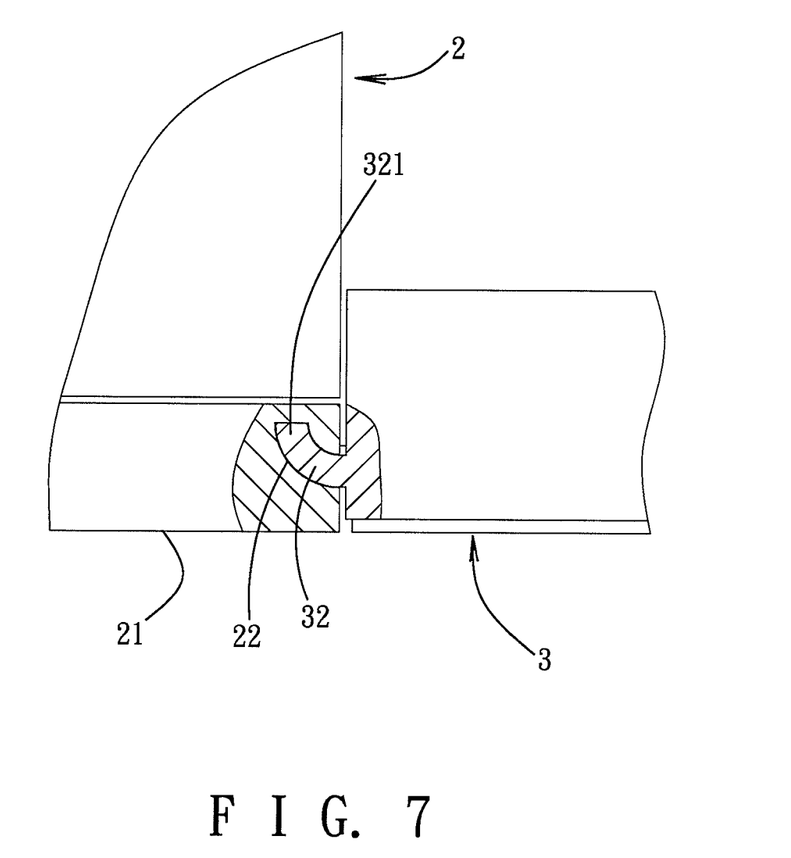
FIG. 7 is a fragmentary partly sectional view illustrating the connection between the power adapter device and the electronic device according to the pre sent invention.

Referring to FIGS. 6 and 7, when sufficient surface is available to place the carrying pad 4, the carrying pad 4 can be constantly disposed in the unfolded state (as shown in FIG. 6), and the connector 33 of the power adapter 3 can be connected to the power-line socket 23 of the electronic device 2 through a power line 34 to supply electric power to the electronic device 2. However, in view of portability of the electronic device 2, there is usually insufficient surface for placing the power adapter 3 when the electronic device 2 is being carried around. In this case, the first connecting mechanism 22 of the electronic device 2 may be directly engaged with the second connecting mechanism 32 of the power adapter 3 (as shown in FIG. 7), specifically by hooking the second connecting mechanism 32 onto the first connecting mechanism 22 such that the power adapter 3 is connected to the electronic device 2, and can, along with the carrying pad 4, be suspended. As a result, not only is it more convenience to use the electronic device 2, but the habit of using a mouse is also not compromised by the portability feature of the electronic device 2.

It should be noted that, in order to stably connect the power adapter 3 to the electronic device 2, in another aspect of this embodiment, the power-line socket 23 is disposed close to the first connecting mechanism 22. When the first connecting mechanism 22 is connected to the second connecting mechanism 32, the connector 33 of the power adapter 3 is plugged into the power-line socket 23 of the electronic device 2. As such, the power line 34 is omitted. Instead, the electric power is directly supplied to the electronic device 2 through the connector 33 and the power-line socket 23 that are connected to each other. In addition, the direct connection between the connector 33 and the power-line socket 23 further strengthens the attachment of the power adapter 3 to the electronic device 2 and enhances the stability and sturdiness of the carrying pad 4 when in the unfolded state. Moreover, with the second connecting mechanism 32 designed as a hook member bending upwards and having the distal end 321 that faces upwards and that abuts against the first connecting mechanism 22, the effect of supporting the carrying pad 4 in the vertical direction when in the unfolded state is further enhanced.

Figure 8:
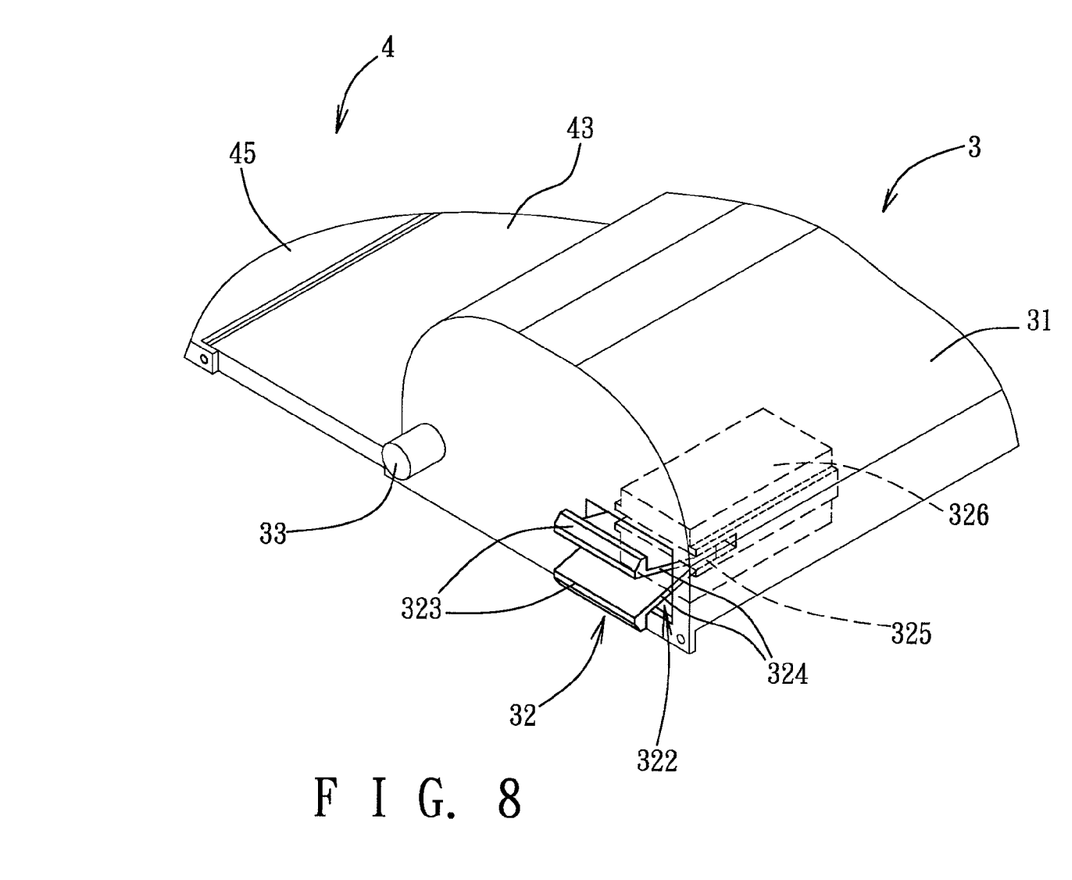
FIG. 8 is a fragmentary perspective view illustrating another embodiment of the power adapter device according to the present invention.
Figure 9:
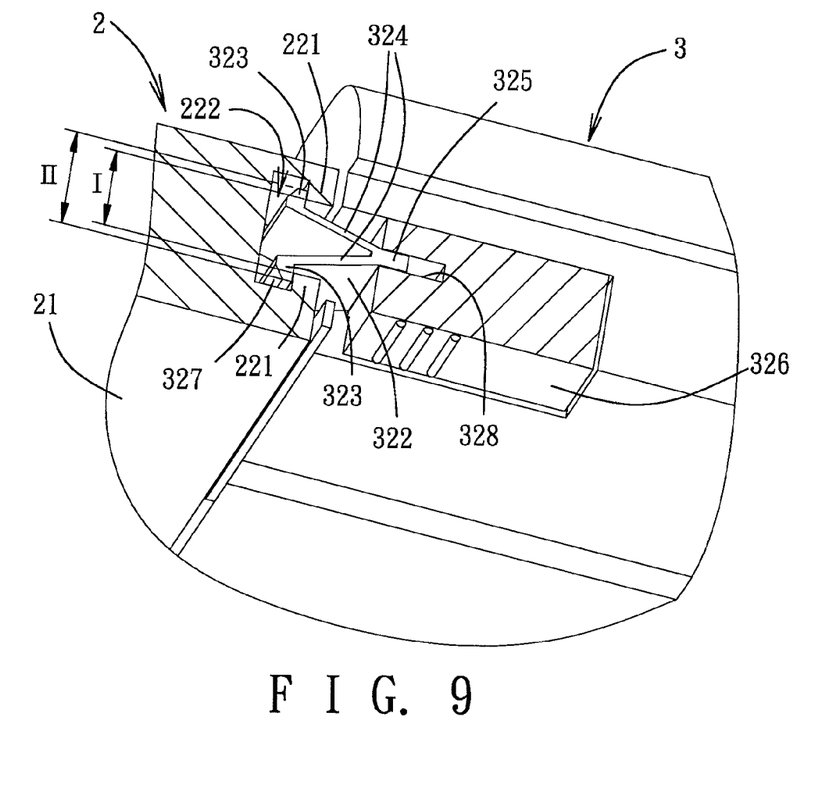
FIG. 9 is a fragmentary partly sectional view illustrating engagement between a first connecting mechanism of the electronic device and a second connecting mechanism of a power adapter of the power adapter device according to the present invention.
Figure 10:
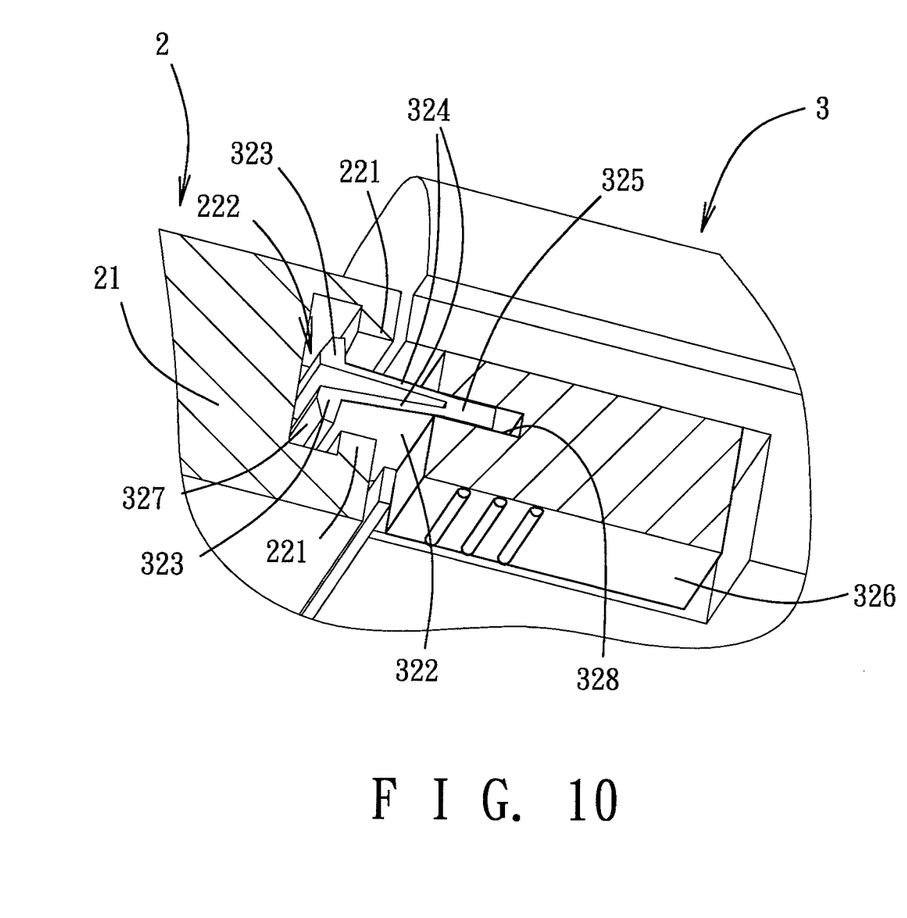
FIG. 10 is a fragmentary partly sectional view illustrating cooperation between an engaging component and a switch of the second connecting mechanism according to the present invention.

FIGS. 8 to 10 show still another embodiment of an assembly of an electronic device and a power adapter device according to the present invention. The assembly of this embodiment is shown to be similar to the above embodiments, and description of similar components will be omitted herein for the sake of brevity.

In this embodiment, the most significant difference lies in structural configurations of the first connecting mechanism 22 of the electronic device 2 and the second connecting mechanism 32 of the power adapter 3. In this embodiment, the first connecting mechanism 22 includes two blocking walls 221 extending toward and facing each other, and a hole 222 disposed between the blocking walls 221. Furthermore, the second connecting mechanism 32 includes an engaging component 322, and a switch 326 slidably disposed at the power adapter body 31 for operating the engaging component 322. The engaging component 322 is substantially in a Y shape, and has a pair of elastic arms 324 opposite to each other. Each of the elastic arms 324 has a first end and a second end and a pair of distal barbs 323. The elastic arms 324 are arranged to form a V shape. The first ends of the elastic arms 324 are connected together to define a clipping end 325. The second ends of the elastic arms 324 are separate from each other, and the distal barbs 323 are respectively formed on the second ends of the elastic arms 324 and extend away from each other. Each of the distal barbs 323 is formed with a chamfer 327. When no external force is exerted on the elastic arms 324, the distal barbs 323 keep away from each other. In this case, a distance (II) between the distal barbs 323 is greater than a height (I) of the hole 222. The engaging component 322 is fixedly attached to the power adapter body 31 of the power adapter 3, the clipping end 325 faces and extends into the interior of the power adapter body 31, and the two distal barbs 323 are exposed from the power adapter body 31.

In this embodiment, the switch 326 is formed with a groove 328 allowing the clipping end 325 of the engaging component 322 to extend thereinto. The groove 328 in the switch 326 faces the clipping end 325 of the engaging component 322, such that the clipping end 325 can extend into the groove 328.

The extension of the clipping end 325 of the engaging component 322 into the groove 328 changes when the switch 326 slides with respect to the power adapter body 31, so that the switch 326 moves toward or away from the two distal barbs 323. In this embodiment, the groove 328 is configured in such a manner that, when the switch 326 slides toward the two distal barbs 323, the two elastic arms 324 are urged by the groove 328 to move toward each other, thereby shortening the distance between the two distal barbs 323.

Thus, when the switch 326 is operated to move toward the distal barbs 323, the elastic arms 324 are pressed by the switch 326 to drive the distal barbs 323 to move toward each other. On the other hand, when the switch 326 is operated to slide away from the distal barbs 323, the distal barbs 323 tend to restore back to their original positions to keep away from each other.

When it is intended to attach the power adapter 3 to the electronic device 2, the two elastic arms 324 of the engaging component 322 are inserted into the hole 222, and the two distal barbs 323 are extended into the hole 222. After the distal barbs 323 extend into the hole 222, the two elastic arms 324 move away from each other due to elastic restoring forces, and abut against internal sides of the two blocking walls 221, respectively. Thus, through structural interference between the first connecting mechanism 22 and the second connecting mechanism 32, the power adapter 3 is attached to the electronic device 2. In this case, the connector 33 close to the second connecting mechanism 32 is also plugged into the power-line socket 23 of the electronic device 2 so as to strengthen stability of the attachment between the power adapter 3 and the electronic device 2 (as shown in FIG. 9).

During insertion of the elastic arms 324 of the engaging component 322 into the hole 222, since the switch 326 is operable to compress the elastic arms 324 to move toward each other and to shorten the distance between the distal barbs 323, before inserting the engaging component 322 into the hole 222, the switch 326 may be operated to shorten the distance between the distal barbs 323, so that the distal barbs 323 of the engaging component 322 may pass through and into the hole 222 smoothly. Alternatively, as the engaging component 322 moves toward the hole 222, the elastic arms 324 move toward each other by guidance of the chamfers 327 of the distal barbs 323 to permit passing of the distal barbs 323 through and into the hole 222.

When a user intends to remove the power adapter 3 from the electronic device 2, the switch 326 is pushed toward the distal barbs 323, so that the distal barbs 323 are compressed to move toward each other, to thereby release the engagement between the distal barbs 323 and the respective internal sides of the blocking walls 221 (as shown in FIG. 10) and enable the removal of the engaging components 322 from the hole 222, so as to disengage the power adapter 3 from the electronic device 2.

Figure 11:
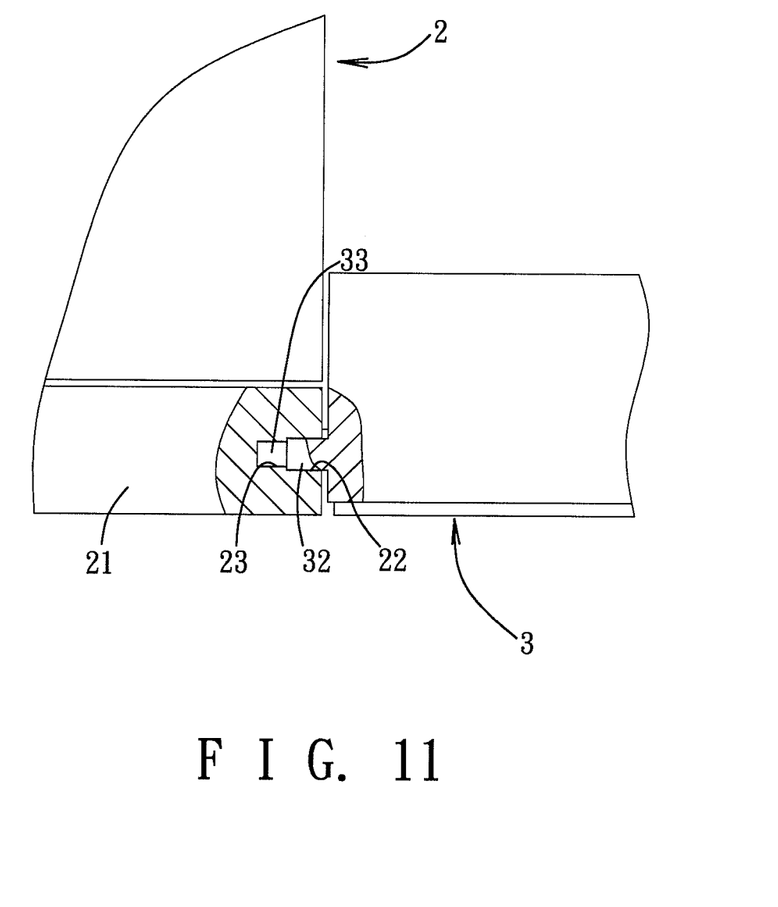
FIG. 11 is a fragmentary partly sectional view illustrating still another embodiment of the power adapter device according to the present invention, where the power adapter of the power adapter device is attached to the electronic device.

FIG. 11 shows yet another embodiment of an assembly of an electronic device and a power adapter device according to the present invention. Most components of the assembly of this embodiment are similar to those in the above embodiments, and are not described here again.

In this embodiment, the most significant difference lies in integration of the power-line socket 23 with the first connecting mechanism 22 and integration of the connector 33 with the second connecting mechanism 32. That is, the power-line socket 23 of the electronic device 2 serves as the first connecting mechanism 22, and the connector 33 of the power adapter 3 serves as the second connecting mechanism 32 in this embodiment. As a result, it is more convenient for users to attach the power adapter 3 to the electronic device 2. In addition, such engagement between the first connecting mechanism 22 (i.e., the power-line socket 23) and the second connecting mechanism 32 (i.e., the connector 33) further enhances the stability of attaching the power adapter 3 onto the device body 21 of the electronic device 2.

It should be noted that, some users may feel uncomfortable when putting his/her wrist on the power adapter 3, and therefore, a soft layer (not shown) may be disposed on the power adapter 3 in practice. The soft layer may be made of a material such as rubber, silicone, or flannel, so as to alleviate the discomfort.

To sum up, the carrying pad 4 is switchable between the unfolded state and the stored state with respect to the power adapter 3, and the second connecting mechanism 32 of the power adapter 3 and the first connecting mechanism 22 of the electronic device 2 are configured to be engageable with each other, so that the power adapter device not only serves as a power supply but also serves to provide the carrying pad 4 as a mouse pad. Further, the habit of using a mouse is not compromised when portability of the electronic device 2 is desired. Thus, the objects of the present invention can surely be achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power adapter device configured to be applied to an electronic device having a device body and a power-line socket disposed on the device body, said power adapter device comprising:
    a power adapter including a power adapter body that has a pad-connecting end, and a pad-storing end opposite to said pad-connecting end; and
    a carrying pad having a free end and an adapter-connecting end opposite to each other, said adapter-connecting end being connected to said pad-connecting end of said power adapter body, said carrying pad being switchable with respect to said power adapter body between an unfolded state, where said carrying pad is unfolded at one side of said power adapter body with said free end being far from said power adapter body, and a stored state, where said carrying pad is folded toward said power adapter body with said free end being close to said pad-storing end of said power adapter body.

2. The power adapter device of claim 1, wherein said carrying pad includes a plurality of pad components that are pivotally connected to one another, that are co-planar in the unfolded state, and that are folded with respect to one another in the stored state.

3. The power adapter device of claim 1, wherein said carrying pad includes:
    a first pad component having a first pad body and a pivotal part that is formed on said first pad body and that pivotally connects said first pad body to said pad-connecting end of said power adapter body, said pivotal part and said first pad body together defining said free end of said carrying pad;
    a second pad component having a second pad body, and an engaging part formed on said second pad body and connecting removably said second pad body to said pad-storing end of said power adapter body, said engaging part and said second pad body together defining said adapter-connecting end of said carrying pad; and at least one third pad component having a third pad body that is disposed between said first pad body and said second pad body and that has two opposite ends pivoting respectively on said first pad body and said second pad body.

4. The power adapter device of claim 3, wherein said first pad body has a first abutting face, said second pad body has a second abutting face, and said third pad body has two opposite third abutting faces, one of which is adjacent to said first abutting face of said first pad body, and the other of which is adjacent to said second abutting face of said second pad body;

wherein, when said carrying pad is disposed in the unfolded state, any two adjacent ones of said first, second, and third abutting faces are in tight contact with each other, such that said carrying pad forms a horizontal plane.

5. The power adapter device of claim 4, wherein said first pad component further has a positioning part adjacent to said pad-connecting end of said power adapter body, and said positioning part of said first pad component abuts against a bottom face of said power adapter body when said carrying pad is disposed in the unfolded state.

6. The power adapter device of claim 1, wherein said power adapter includes a connector extending outwardly from said power adapter body and being configured to be connected to the electronic device, said power adapter body being attachable removably to the device body of the electronic device.

7. The power adapter device of claim 1, the electronic device further including a first connecting mechanism disposed on one side of the device body, wherein said power adapter further includes a second connecting mechanism disposed on said power adapter body and configured to engage the first connecting mechanism of the electronic device.

8. The power adapter device of claim 7, wherein said second connecting mechanism is configured as a hook member that has a distal end, that protrudes laterally from said power adapter body, and that is bent upwards with said distal end facing upwards.

9. The power adapter device of claim 7, the first connecting mechanism including two blocking walls facing each other and a hole disposed between the blocking walls, wherein said second connecting mechanism includes an engaging component having a pair of distal barbs elastically movable toward each other; and wherein, when said second connecting mechanism is engaged with the first connecting mechanism, said distal barbs extend into said hole and respectively engage the blocking walls, said distal barbs being released from the blocking walls and removal of said distal barbs from the hole being enabled when said distal barbs move toward each other.

10. The power adapter device of claim 9, wherein said engaging component further includes a pair of elastic arms each of which has a first end and a second end, said first end of one of said elastic arms being connected to said first end of the other one of said elastic arms to cooperatively define a clipping end, each of said distal barbs being disposed at said second end of a respective one of said elastic arms, said second connecting mechanism further including a switch that is slidably disposed on said power adapter body to move close to and away from said distal barbs and that has a groove allowing said clipping end of said engaging component to extend thereinto; and wherein, when said switch slides toward and is close to said distal barbs, said elastic arms are pressed by said switch to drive said distal barbs to move toward each other.

11. An assembly, comprising:

an electronic device including a device body, a first connecting mechanism disposed on one side of said device body, and a power-line socket close to said first connecting mechanism;

a power adapter including a power adapter body, a second connecting mechanism disposed on said power adapter body and engaged with said first connecting mechanism of said electronic device, and a connector protruding from said power adapter body and connected to said power-line socket of said electronic device, said power adapter body having a pad-connecting end and a pad-storing end opposite to said pad-connecting end; and a carrying pad having a free end and an adapter-connecting end opposite to each other, said adapter-connecting end connected to said pad-connecting end of said power adapter body, said carrying pad being switchable with respect to said power adapter body between an unfolded state, where said carrying pad is unfolded at one side of said power adapter body with said free end being far from said power adapter body, and a stored state, where said carrying pad is folded toward said power adapter body with said free end being close to said pad-storing end of said power adapter body.

12. The assembly of claim 11, wherein said carrying pad includes a plurality of pad components that are pivotally connected to one another, that are co-planar in the unfolded position, and that are folded with respect to one another in the stored state.

13. The assembly of claim 12, wherein said carrying pad includes:

a first pad component having a first pad body and pivotal part formed on said first pad body and pivotally connecting said first pad body to said pad-connecting end of said power adapter body, said pivotal part and said first pad body together defining said free end of said carrying pad;

a second pad component having a second pad body, and an engaging part formed on said second pad body and connecting removably said second pad body to said pad-storing end of said power adapter body, said engaging parts and said second pad body together defining said adapter-connecting end of said carrying pad; and at least one third pad component having a third pad body that is disposed between said first pad body and said second pad body and that has two opposite ends pivoting respectively on said first pad body and said second pad body.

14. The assembly of claim 13, wherein said first pad body has a first abutting face, said second pad body has a second abutting face, and said third pad body has two opposite third abutting faces, one of which is adjacent to said first abutting face of said first pad body, and the other of which is adjacent to said second abutting face of said second pad body;

wherein, when said carrying pad is disposed in the unfolded state, any two adjacent ones of said first, second and third abutting faces are in tight contact with each other, such that said carrying pad forms a horizontal plane.

15. The assembly of claim 14, wherein said first pad component further has a positioning part adjacent to said pad-connecting end of said power adapter body, and said positioning part of said first pad component abuts against a bottom face of said power adapter body when said carrying pad is disposed in the unfolded state.

16. The assembly of claim 11, wherein said second connecting mechanism is configured as a hook member that has a distal end, that protrudes laterally from said power adapter body, and that is bent upwards with said distal end facing upwards.

17. The assembly of claim 11, wherein said first connecting mechanism includes two blocking walls facing each other and a hole disposed between said blocking walls, and said second connecting mechanism includes an engaging component having a pair of distal barbs elastically movable toward each other; and wherein, when said second connecting mechanism is engaged with said first connecting mechanism, said distal barbs extend into said hole and respectively engage said blocking walls, said distal barbs being movable toward each other so as to be released from said blocking walls and to be removed from said hole.

18. The assembly of claim 17, wherein said engaging component further includes a pair of elastic arms each of which has a first end and a second end, said first end of one of said elastic arms being connected to said first end of the other one of said elastic arms to cooperatively define a clipping end, each of said distal barbs being disposed at said second end of a respective one of said elastic arms, said second connecting mechanism further including a switch that is slidably disposed on said power adapter body to move toward and away from said distal barbs and that has a groove allowing said clipping end of said engaging component to extend thereinto;

wherein, when said switch slides toward and is close to said distal barbs, said elastic arms are pressed by said switch to drive said distal barbs to move toward each other.

* * * * *